(12) United States Patent
Wang et al.

(10) Patent No.: US 9,826,277 B2
(45) Date of Patent: Nov. 21, 2017

(54) METHOD AND SYSTEM FOR COLLABORATIVE AND SCALABLE INFORMATION PRESENTATION

(71) Applicant: TCL RESEARCH AMERICA INC., San Jose, CA (US)

(72) Inventors: Haohong Wang, San Jose, CA (US); Mea Wang, San Jose, CA (US); Yuchen Wang, San Jose, CA (US)

(73) Assignee: TCL RESEARCH AMERICA INC., San Jose, CA (US)

( * ) Notice: Subject to any disclaimer, the term of this patent is extended or adjusted under 35 U.S.C. 154(b) by 324 days.

(21) Appl. No.: 14/603,421

(22) Filed: Jan. 23, 2015

(65) Prior Publication Data

US 2016/0219338 A1     Jul. 28, 2016

(51) Int. Cl.
*H04N 5/445* (2011.01)
*H04N 21/4788* (2011.01)
*H04L 29/08* (2006.01)
*H04N 21/4782* (2011.01)
*H04N 21/4402* (2011.01)
(Continued)

(52) U.S. Cl.
CPC ......... *H04N 21/4788* (2013.01); *H04L 67/02* (2013.01); *H04L 67/025* (2013.01); *H04L 67/10* (2013.01); *H04L 67/12* (2013.01); *H04L 67/125* (2013.01); *H04L 67/18* (2013.01); *H04N 21/4122* (2013.01); *H04N 21/4316* (2013.01); *H04N 21/440218* (2013.01); *H04N 21/4516* (2013.01); *H04N 21/4722* (2013.01); *H04N 21/4782* (2013.01); *H04N 21/482* (2013.01); *H04N 21/4858* (2013.01); *H04N 21/8545* (2013.01)

(58) Field of Classification Search
CPC .......... H04N 21/4788; H04N 21/8545; H04N 21/44029
USPC ................................. 725/43, 47, 48
See application file for complete search history.

(56) References Cited

U.S. PATENT DOCUMENTS 8,774,168 B2 * 7/2014 Petrack ............... H04M 7/1205
370/352
9,285,947 B1 * 3/2016 Story, Jr.
(Continued)

FOREIGN PATENT DOCUMENTS

CN         103207766 A      7/2013

*Primary Examiner* — Pankaj Kumar
*Assistant Examiner* — Sahar Baig
(74) *Attorney, Agent, or Firm* — Anova Law Group, PLLC

(57) ABSTRACT

The present invention provides an information presentation system, comprising: a video module configured to obtain video content to be presented to a user; a network module configured to obtain certain information related to the video content including at least a first type of related information, a second type of related information, and a third type of related information; a first display configured to display the video content at a primary location in front of the user; one or more second displays configured to display the first type related information at the primary location outside the first display and to display the second type related information on a secondary location along the side of the primary location; an interactive display configured to interact with the user and display the third type related information; and a system controller configured to perform content assignments to the displays according to requirements from the user.

17 Claims, 6 Drawing Sheets

(51) Int. Cl.
*H04N 21/431* (2011.01)
*H04N 21/41* (2011.01)
*H04N 21/45* (2011.01)
*H04N 21/4722* (2011.01)
*H04N 21/482* (2011.01)
*H04N 21/485* (2011.01)
*H04N 21/8545* (2011.01)

(56) References Cited

U.S. PATENT DOCUMENTS

| | | | | |
|---|---|---|---|---|
| 2004/0146840 | A1* | 7/2004 | Hoover | F41G 3/2627 434/21 |
| 2010/0201878 | A1* | 8/2010 | Barenbrug | H04N 5/44591 348/563 |
| 2011/0019156 | A1* | 1/2011 | Chang | H04N 9/3173 353/31 |
| 2012/0090005 | A1* | 4/2012 | Marlow | G06Q 30/0241 725/42 |
| 2012/0150970 | A1* | 6/2012 | Peterson | G06F 3/04817 709/206 |
| 2012/0274850 | A1* | 11/2012 | Hawkins | H04N 21/4307 348/515 |
| 2013/0155076 | A1* | 6/2013 | Wodka | H04N 21/25891 345/502 |
| 2013/0329140 | A1* | 12/2013 | Silverberg | H04N 21/4432 348/734 |
| 2014/0111700 | A1* | 4/2014 | Paxinos | H04N 5/4403 348/734 |
| 2014/0146080 | A1* | 5/2014 | Ivashin | G09G 5/12 345/629 |
| 2014/0359681 | A1* | 12/2014 | Amidei | H04N 21/8547 725/93 |
| 2015/0120953 | A1* | 4/2015 | Crowe | H04L 65/60 709/231 |
| 2015/0128046 | A1* | 5/2015 | Cormican | H04N 21/4143 715/720 |
| 2015/0195620 | A1* | 7/2015 | Buchner | H04N 21/4788 725/141 |
| 2015/0281769 | A1* | 10/2015 | Chiu | H04N 5/38 348/564 |
| 2016/0066021 | A1* | 3/2016 | Thomas | H04N 21/4312 725/14 |
| 2016/0182854 | A1* | 6/2016 | Suzuki | H04N 7/147 348/14.07 |
| 2016/0205429 | A1* | 7/2016 | Ortiz | H04N 21/4222 725/25 |

* cited by examiner

METHOD AND SYSTEM FOR COLLABORATIVE AND SCALABLE INFORMATION PRESENTATION

FIELD OF THE DISCLOSURE

The present disclosure relates to the field of information presentation technologies and, more particularly, relates to collaborative and scalable information presentation.

BACKGROUND

For years, researchers have been struggling to bring immersive experiences to home entertainment. Based on the observation that larger display with a wider field of view may cause the user more immersed and present-in experience, "Focus+Context" display was first proposed to have a high-resolution display (focus) surrounded by a lower resolution projection screen (context) to enhance immersive experiences. This way, users perceive the scene-consistent, low-resolution color, light, and movement patterns projected into their peripheral vision as a seamless extension of the primary content.

As an extension of the "Focus+Context" concept, the Infinity-By-Nine project displayed video content on three projector screens surrounding a television. The system uses optical flow, color analysis, and pattern-aware out-painting algorithms to create a synthetic light field beyond the screen edge and projects it onto walls, ceiling, or other suitable surfaces within the peripheral awareness of the viewer.

Recently, IllumiRoom project of Microsoft Research advances this idea to high-resolution projected content, which is dynamically adapted to the TV program content and user interaction. IllumiRoom does not require installing expensive projection screens, nor changing anything about the existing living room, which leverages the existing physical environment to create unique virtual-physical game experiences.

However, the IllumiRoom system is aiming at providing users a more magical gaming experience, and all illusions that it can create need the triggers from the specially-designed games, which limits its usability to the people who are not game fans. A more general framework to provide user immersive home entertainment is expected to get viewer more engaged into the program with more supporting content with lighting/illusion effects.

Nowadays, mobile devices, such as smartphones and tablets, are becoming more powerful in terms of computing and display, projectors are becoming smaller, quieter, and clearer. TVs are becoming a big screen computer with easy access to the Internet and many video content providers (e.g., YouTube and Netflix), and link capacity around individual device has been significantly increased. The home entertainment systems are experiencing revolutionary changes. Many devices surround people in their daily lives, and provide various ways to access, retrieve, and view contents. People use different devices at different scenarios. For example, a user may enjoy a show on a big-screen TV at home, or on a tablet when going to a room without TV, and continue the experience on a smartphone when stepping out of the house. Such continuous and seamless viewing experience requires collaboration among devices and intelligence in determining user intension.

On the other hand, according to Simply Measured, the in-depth measurement across popular online social networks (OSNs), including Facebook, video is shared 1200% more times than links and text combined. Video streaming is tightly coupled with social interaction. Links to popular videos can be quickly spread through OSNs. Videos can also generate social interactions. In addition, several studies show a clear tendency of the user to use tablet or smartphone when watching television, and other studies distinguish a higher percentage of comments or posts on social networks, about the content being watched. Sidecastr is a TV companion app for scene-synchronized enjoyment of high quality social comments tweeted by fans, friends, and celebrities. This system advances the idea to use intelligence to deliver better experience to users, such as the audio detection, and seamlessly keeps comments in constant sync with whatever the users are watching on the primary TV screen. It provides users the manually filtered information of the live Twitter stream without the spam, off-timed comments. Moreover, people search related information and interact with people in different forms on smart devices when watch TV, such interaction helps to direct users to content that suit their interests and needs. Hence, enhanced entertainment experience requires collaboration among people.

AmigoTV proposed the concept to let viewers communicate during watching broadcast. People are represented by their selected avatar in overlay on their TV screen and that of their buddies that are watching the same channel. But all graphics and avatars of the friends are shown in overlay on the broadcast channel, claiming that this is the way to immerse the viewer into the content. However, due to the limit of the screen size and the property of the program, users are likely to complain about the content to be covered and feel the social information annoying.

From the technical point-of-view, to increase the overall link capacity around individual devices, collaborative systems have been proposed in Microcast, in which short-range links such as WiFi and Bluetooth are utilized. Although Microcast achieves good streaming rates by utilizing both 3G and WiFi channels, it is limited by the centralized scheduler and is challenged by energy consumed by the complex coding operations. Mining OSNs may uncover useful information on sharing patterns and hints on efficient delivery of streaming content. For this reason, AMES-Cloud, a framework for mobile multimedia streaming, is proposed, in which video content is pre-fetched according to online social activities. Similarly, MBoard considers social links to direct a multimedia sharing system for online forums.

Given the advancements in hardware and in devising information from OSNs, the primary challenges for providing such a collaborative entertainment system are integrating of devices, compiling useful information according to the needs of users, and providing non-distracting methods for social interaction. From the human computer interaction perspective, the challenge is how to transform the passive lonesome TV consumption behavior into a compelling social experience. From the technology perspective, the challenges are aggregating information from different services, synchronization of content delivered over different networks, and rendering and displaying information and content according to preference of users. The information presentation scalability requires the system has sufficient intelligence to determine the information priorities and fitness before project them onto a view window.

Overall, immersive entertainment is expected to be a collaborative effort among devices, people and content. The disclosed method and system are directed to solve one or more problems set forth above and other problems. It should be noted that, unless explicitly acknowledged, the above background information is part of the present disclosure and is not intended to be prior art.

BRIEF SUMMARY OF THE DISCLOSURE

One aspect of the present disclosure provides an information presentation system, comprising: a video module, a network module, a first display, one or more second displays, an interactive display and a system controller. The video module is configured to obtain video content to be presented to a user. The network module is configured to obtain certain information related to the video content for the user including at least a first type of related information, a second type of related information, and a third type of related information. Further, the first display is configured to display the video content at a primary location in front of the user. The second displays are configured to display the first type related information at the primary location outside the first display and to display the second type related information on a secondary location along the side of the primary location. The interactive display is configured to interact with the user and display the third type of related information. In addition, the system controller is configured to perform content assignments to the first display, the one or more second displays, and the interactive display according to requirements from the user for the video content and the related information.

Another aspect of the present disclosure provides an information presentation method, comprising: starting a system controller to access an information presentation system; detecting one or more available displays in the information presentation system; and selecting to play a video content and to present certain information related to the video content by a user, the related information including at least a first type of related information, a second type of related information, and a third type of related information. The method further comprises performing content assignments to the available displays according to requirements from the user; obtaining the video content and the related information; displaying the video content on a first display at a primary location in front of the user; displaying, on one or more second displays, the first type related information at the primary location outside the first display and displaying the second type related information on a secondary location along the side of the primary location; and interactively presenting the third type of related information on an interactive display.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the invention, which are illustrated in the accompanying drawings. Hereinafter, embodiments consistent with the disclosure will be described with reference to drawings. Wherever possible, the same reference numbers will be used throughout the drawings to refer to the same or like parts. It is apparent that the described embodiments are some but not all of the embodiments of the present invention. Based on the disclosed embodiment, persons of ordinary skill in the art may derive other embodiments consistent with the present disclosure, all of which are within the scope of the present invention.

The present disclosure provides CITIS (Collaborative Immersive enTertainment with Information presentation Scalability), an enhanced user experience model for home entertainment. CITIS fully supports features including getting viewers more engaged into the program, providing continuous and seamless viewing experience and enabling collaboration among people.

Figure 1:
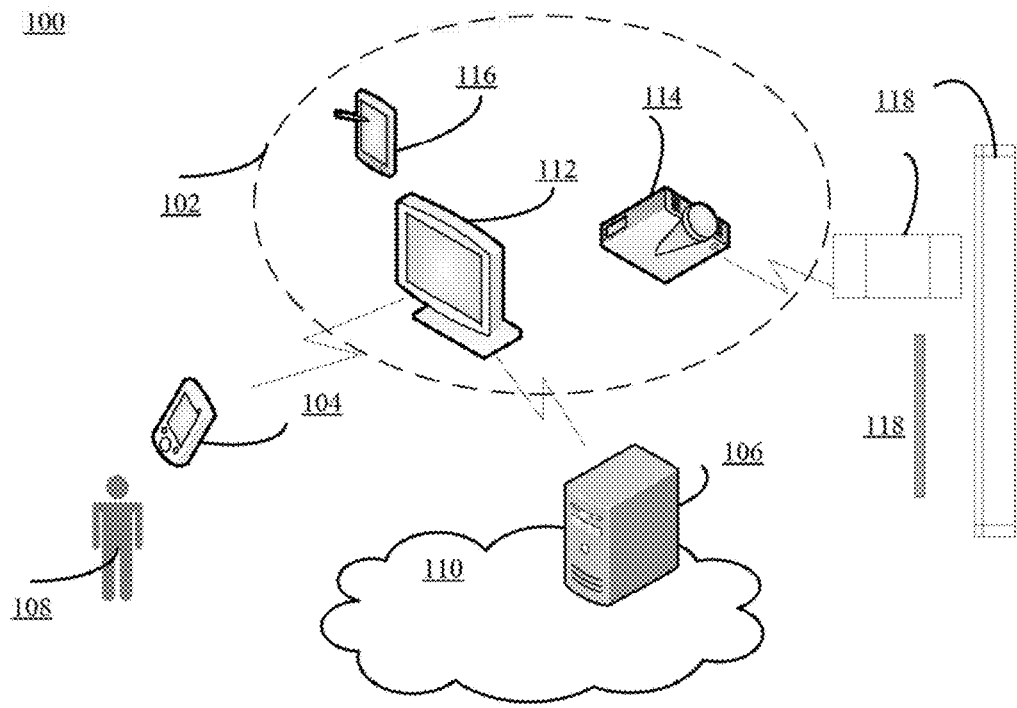
FIG. 1 illustrates an exemplary environment incorporating certain embodiments of the present invention.

FIG. 1 illustrates an exemplary environment 100 incorporating certain embodiments of the present invention. As shown in FIG. 1, environment 100 may include a plurality of displays 102, a remote control 104, a server 106, a user 108, and a network 110. Certain devices may be omitted and other devices may be included.

The displays 102 may include one or more of a television set (TV) 112, a projector 114 and other smart devices 116 with computing systems, such as a personal computer (PC), a tablet or mobile computer, or a smart phone, etc. The TV 112 may include any appropriate type of TV, such as plasma TV, liquid crystal display (LCD) TV, projection TV, non-smart TV, or smart TV.

Further, the projector 114 may include one or more projectors that can project contents to any surfaces 118. The projected surfaces 118 may include walls, tables, curtains, etc. For example, the projector 114 may include a multi-directional projector that can project to surrounding walls. The projector 114 may also include a projector with embedded sensors which allow users to interact with the projected content, such as motion control and voice control. The projector 114 may also sense the texture and color of surrounding projected surfaces and distort the project contents accordingly such that the contents can be displayed with a normal viewing effect.

Furthermore, the displays 102 may be any appropriate content-presentation device capable of presenting multiple programs in one or more channels, which may be controlled through the remote control 104.

The remote control 104 may include any appropriate type of remote control that communicates with and controls the displays 102, such as a customized TV remote control, a universal remote control, a tablet computer, a smart phone, or any other computing device capable of performing remote control functions. The remote control 104 may also include other types of devices, such as a motion-sensor based remote control, or a depth-camera enhanced remote control, as well as simple input/output devices such as a keyboard, a mouse, and a voice-activated input device, etc.

The user 108 may interact with the displays 102 using remote control 104 to watch various programs and perform other activities of interest, or the user may simply use hand or body gestures to control the displays 102 if motion sensor or depth-camera is used by the displays 102. The user 108 may also interact with display 102 directly and may interact with multiple displays 102 simultaneously. The user 108 may be a single user or a plurality of users, such as family members watching TV programs together.

Further, the server 106 may include any appropriate type of server computer or a plurality of server computers for providing information contents to the user 108. The server 106 may also facilitate communication, data storage, and data processing between the remote control 104 and displays 102. Displays 102, remote control 104, and server 106 may communicate with each other through one or more communication networks 110, such as a cable network, a wireless network, a phone network, and/or a satellite network, etc.

The network 110 may include any number of communication networks and servers for providing various media and contents for the server 106, such as streaming video, photos and images, interacting in social networks, etc.

Figure 2:
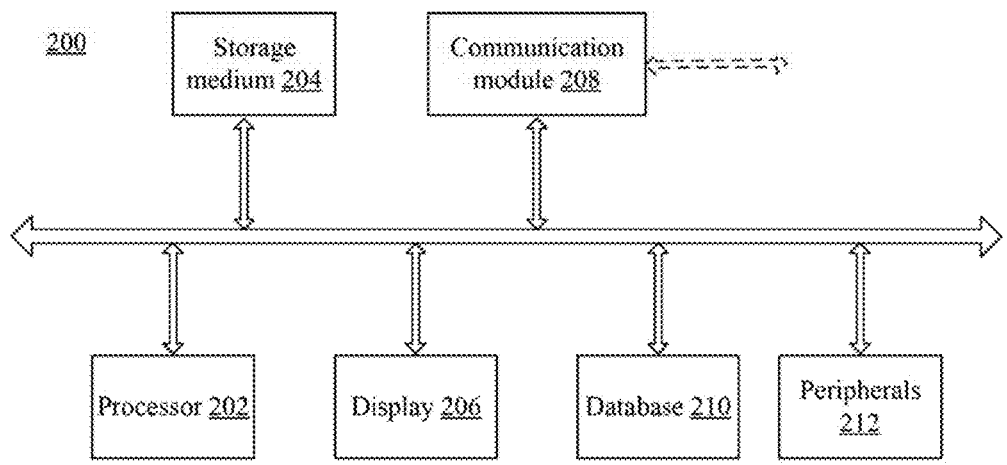
FIG. 2 illustrates an exemplary computing system consistent with the disclosed embodiments.

Displays 102, remote control 104, and/or server 106 may be implemented on any appropriate computing circuitry platform. In operation, the computing circuitry platform may obtain contents from the server 106 and/or the network 110, and may perform certain image/video processing, such as transcoding a video with additional contents. FIG. 2 shows a block diagram of an exemplary computing system 200 capable of implementing displays 102, remote control 104, and/or server 106.

As shown in FIG. 2, computing system 200 may include a processor 202, a storage medium 204, a display 206, a communication module 208, a database 210 and peripherals 212. Certain devices may be omitted and other devices may be included.

Processor 202 may include any appropriate processor or processors. Further, processor 202 can include multiple cores for multi-thread or parallel processing. Processor 202 may execute sequences of computer program instructions to perform various processes. Storage medium 204 may include memory modules, such as ROM, RAM, flash memory modules, and mass storages, such as CD-ROM and hard disk, etc. Storage medium 204 may store computer programs for implementing various processes when the computer programs are executed by processor 202.

Further, communication module 208 may include certain network interface devices for establishing connections through communication networks. Database 210 may include one or more databases for storing certain data and for performing certain operations on the stored data, such as database searching.

Display 206 may provide information to a user or users of the displays 102. Display 206 may include any appropriate type of computer display device or electronic device display (e.g., CRT or LCD based devices). Display 206 may also include projectors that may project to any surfaces. The projected contents may be adjusted to the surface area, texture and color. Peripherals 212 may include various sensors and other I/O devices, such as camera, motion sensor, recorder, speaker, keyboard and mouse. Further, peripherals 212 may facilitate video chatting, voice control and sense user motions for receiving user instructions.

In operation, the computing system 200 may perform certain processes to provide a collaborative and scalable information presentation experience. For example, processor 202 may coordinate and send videos, images, social feeds and other related information to various display devices 206. The computing system 200 may also interact with users to customize the viewing experience through processor 202 and peripherals 212. Further, the computing system 200 may facilitate video chatting and other social activities through processor 202, communication module 208 and peripherals 212.

Figure 3:
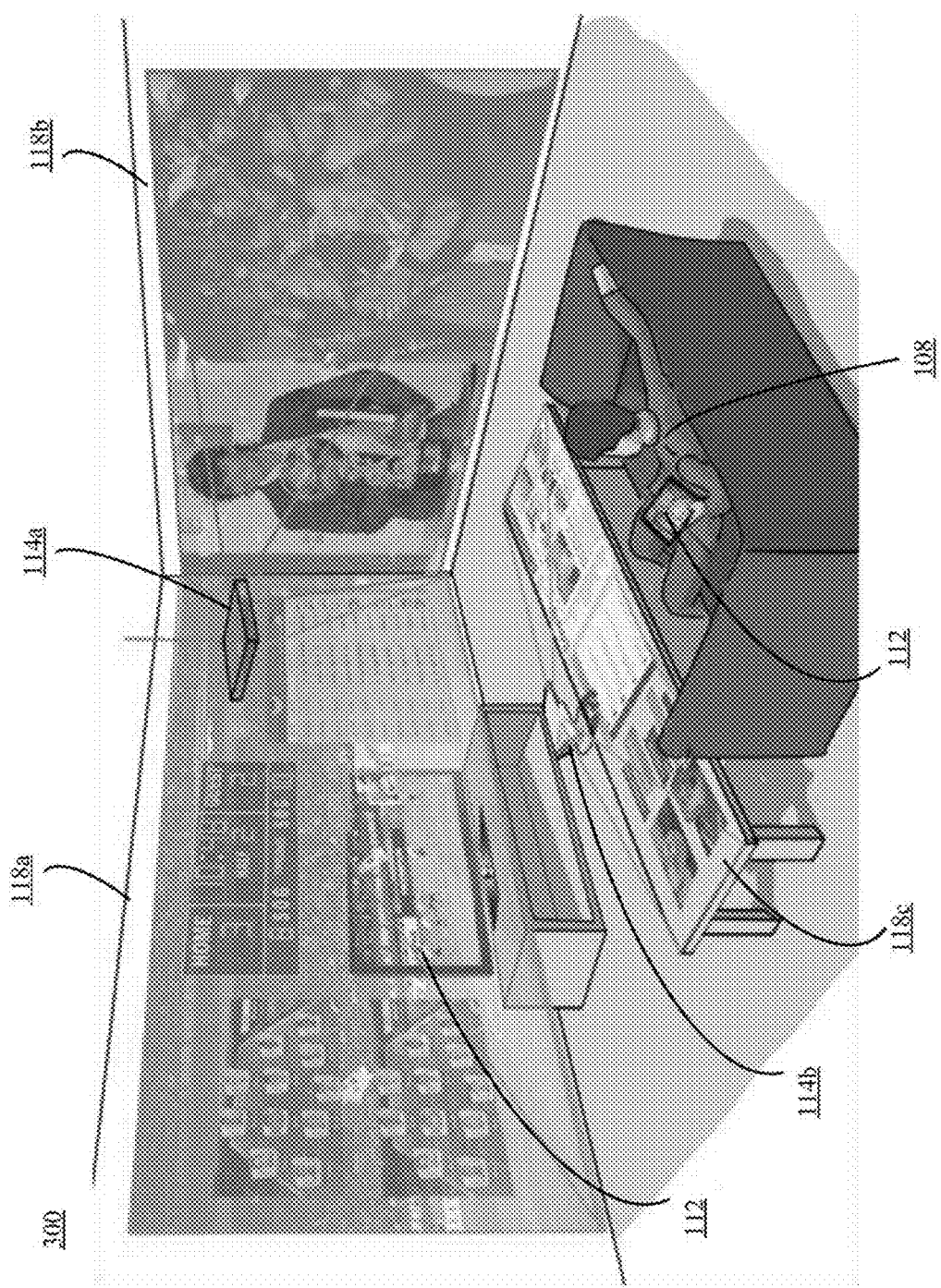
FIG. 3 illustrates an exemplary immersive environment of a collaborative and scalable information presentation system consistent with the disclosed embodiments.

FIG. 3 illustrates an exemplary embodiment of an immersive environment incorporating a collaborative and scalable information presentation system. The collaborative and scalable information presentation system 300 may include a TV 112, a multi-directional projector 114a, a sensor-embedded projector 114b, a mobile device 116 and a plurality of projecting surfaces 118a, 118b and 118c. Certain devices may be omitted and other devices may be included.

To enhance the viewing experience and blur the boundary between the onscreen content and the surrounding room, the visual experience is extended outside the screen of the TV 112, using projectors 114a and 114b that cover a wide area of the surrounding physical environment. In some embodiments, the multi-directional projector 114a may project to surrounding walls 118a and 118b. In addition, the sensor-embedded projector 114b can be placed on the side of table 118c, projecting contents to the table 118c and enabling users to interact with the projected content.

In certain embodiments, a user 108 may be watching a football game through the broadcast. The background of the field and the response of the audience are projected to the surrounding walls 118a and 118b. The high priority information, like the scores of the two teams, the arrangement of the players and real time statistical data are shown on the surrounding wall 118a around the TV 112, while the secondary information, such as the poster of the player who just kicked a goal, can be projected on the side wall 118b. The big table 118c in the living room may also be a good place to display information. The sensor-embedded projector 114b may arrange all content which may need user interactions on the table, such as the video chatting with friends, posting and replying twitter feed on social network, and browsing game related news and articles. The user 108 can customize the assignment of content to the places to be projected through the mobile device 112. The mobile device 112 may be one or more of a remote control, a smartphone, a tablet and a laptop computer.

In operation, the collaborative and scalable information presentation system 300 provides a home entertainment model, CITIS (Collaborative Immersive enTertainment with Information presentation Scalability). Due to the lack of detail and different neural processing in the peripheral region of the eye, users can perceive the scene-consistent, low-resolution color, light, and movement patterns projected into their peripheral vision as a seamless extension of the primary content. Two display planes may be placed closed enough to reduce the visible gaps and noticeable misalignment perceived by users. In certain embodiments, the wall 118a behind the TV 112 may be used as the primary projection surface, so users can perceive focus (high-resolution television) and context (extended low-resolution projection) screens as a single display.

CITIS may also apply projection-based art installation technology, known as projection mapping which is a projection technology used to turn objects, often irregularly shaped, into a display surface for video projection. The projection technology can interact with a projector to fit any desired image onto the surface of any object. The projection technology can sense the texture and color of surrounding projected surfaces and distort the project contents accordingly such that the contents can be displayed with a normal viewing effect. Users do not need to worry about there may not be enough flat curtain or empty walls for the projection, since the projected light may be modulated to achieve a desired color and the texture can be corrected, given knowledge of the existing surface color and geometry. The system 300 may also have the intelligent to switch the entire room setting when a user switches between games. Further, the system 300 can provide pre-configured settings to emulate different viewing environments, e.g., the bar, the theatre, or the arena.

Thus, the CITIS on the system 300 provides an immersive environment. That is, the CITIS lets users to feel the real excitement visually, mentally and physically due to the multiple integrated display areas and display environment. The CITIS also provides rich information, e.g., the user is a click away from any related news and information during the entertainment experiences. Further, the CITIS also provides intelligent viewing experience with adaptive multi-views with scene analysis, and adaptive playback speed with summarization technology, that is, user can enter a video program any time with a short-period catch-up of story summary. Further, the CITIS provides engaging social interaction, making the user be expressive and enjoy the moment; and customization by tailoring the experience to personal taste of a user.

The CITIS may also provide scalability, considering the device capability varying from family to family. In other words, the system 300 may be scaled from a single device to any number of devices presented around a user. On one end, the user may watch the video on a single device (TV, tablet, or smartphone), but may also have access to all CITIS features on the single device. On the other end, the system 300 may utilize all display methods on a large number of devices to enhance the viewing experience. Since users have different viewing habit and preference, the system 300 may be designed to be highly configurable so that the entire system can be tailored according to a user's specific taste and resource availability.

In certain embodiments, the collaborative and scalable information presentation system 300 may be used by a user to watch certain TV programs. For example, when watching a soccer game in the living room, a user may easily find all related news, the bio of the player and the history of the team displayed right beside the live match. When a team scores a goal, the exciting audiences are cheering beside the user. The user can share the excitement with friends over voice or video chatting, rather than texting on the smartphone and missing other exciting moments on the screen. Also a user can hear friends reply and read the projected interesting comments from social network at user preferred location in the living room, e.g., the coffee table 314, the walls 310 and 312, or smart devices 308. This is just one of many interaction scenarios with the peripheral projected collaborative immersive environment of CITIS.

When the collaborative and scalable information presentation system 300 is incorporated and applied to watching a soccer game, watching a soccer game involves demanding quality assurance and real-time integration of many services. To compare with watching a match at the arena, at the bar, or at home, the following five Quality of Experience (QoE) metrics are utilized: 1) Environment: the environment surrounding viewers; 2) Information: information required by viewers before, during, or after the game; 3) Views: different views of the actual match; 4) Social interaction: sharing and expressing though and feelings with others; and 5) Customization: the ability to customize any of the above four QoE metrics. With the CITIS on the system 300, desired QoE metrics can be achieved.

Figure 4:
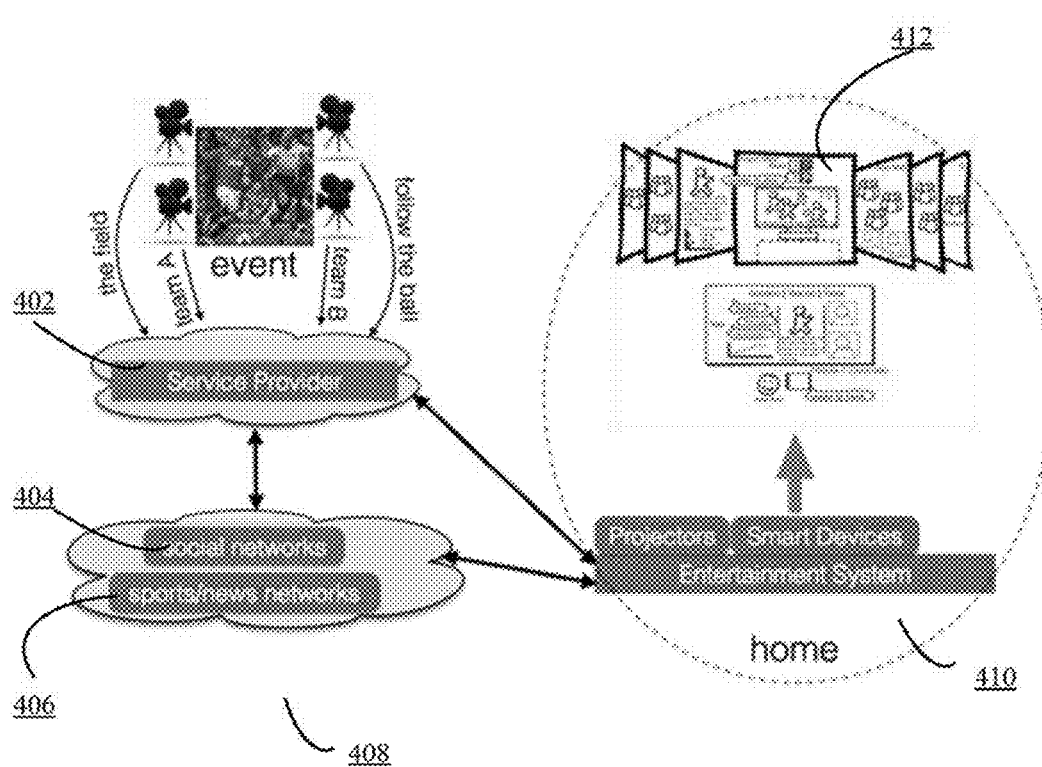
FIG. 4 illustrates an exemplary system architecture of a collaborative and scalable information presentation system consistent with the disclosed embodiments.

FIG. 4 illustrates exemplary system architecture of a collaborative and scalable information presentation system consistent with the disclosed embodiments. In order to deliver the immersive and engaging setting, the system architecture 400 may include a content/service provider 402, social networks 404, sports/news networks 406, and a home entertainment system 410. Certain components may be omitted and other components may be included.

As shown in FIG. 4, the content/service provider 402 may collect video streams from different camera angles and transcode the videos for different quality levels and streaming requirements. The social networks 404 may provide platforms for social interaction customized for the event. The content/service provider 402, the social networks 404, the sports/news networks 406 may comprise information sources 408 to deliver related information about the event. The related information may be retrieved according to user requirements and social demand.

Further, the home entertainment system 410 interacts with the service/content provider 402, the social network 404, and the sports/news networks 406 to render video streams and to compile real-time information as well as social interaction to be displayed in the living home. The home entertainment system 410 may include one or more of projectors and smart devices that allows collaborative and scalable information presentation. A system interface 412 may be configured according to user requirements to assign and present contents on the smart devices and projected surfaces. The home entertainment system 410 may refer to any information presentation system that involves displaying videos, images, texts and other visible or interactive subjects.

Figure 5:
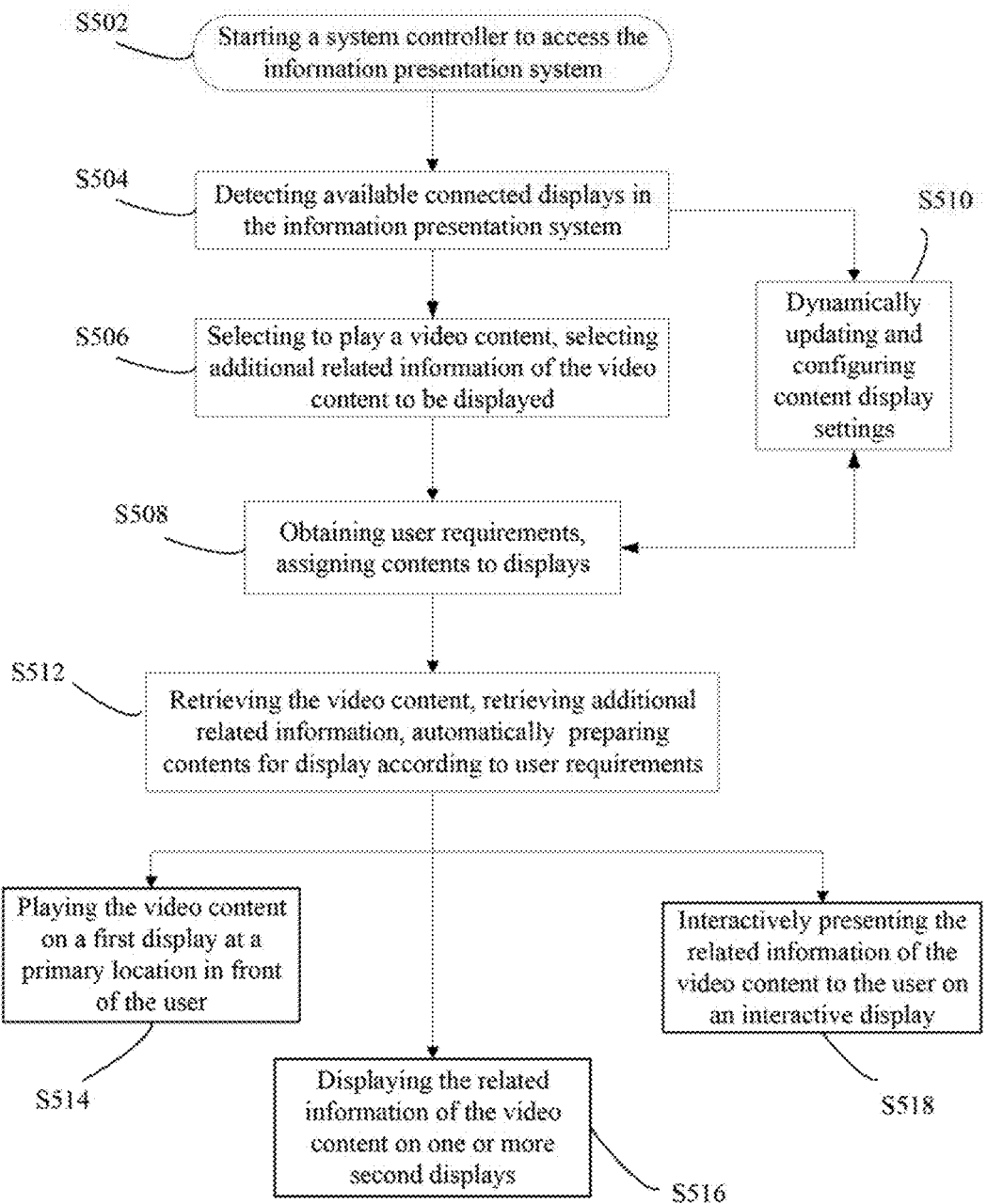
FIG. 5 illustrates an exemplary collaborative and scalable information presentation process consistent with the disclosed embodiments

FIG. 5 illustrates an exemplary collaborative and scalable information presentation process consistent with the disclosed embodiments. As shown in FIG. 5, the process 500 may first allow a user to start a system controller to access an information presentation system (S502). The system controller may be provided by the displays 102, the remote control 104 or the server 106 that implements on any appropriate computing circuitry platform. The information presentation system may include one or more display modules, such as TVs, projectors and smart devices.

Further, available connected displays in the information presentation system may be detected (S504). The system controller may collect information of the available connected displays, including the number of connected displays, and model, compatibility and working status of each display. In one embodiment, the available display modules may include a TV, a multi-directional projector, a sensor-embedded projector and a smart device. In another embodiment, there may be only one available display, such as a TV or a smart device.

The user may browse a list of contents and choose to play a video content, and the system controller may prompt the user other related information of the video to be displayed together (S506). The video content may refer to any graphical presentation of a series of images, such as a TV show, a movie, a flash, a presentation, etc. In certain embodiments, the user may be browsing through TV channels and decide on watching a sports event. The user may be given the choice to display related information of the sports event, including real-time statistics, arrangement of team players, response of the audience, background of the field, biography of the players, related news and articles, social interactions about this event, etc. The social interactions may include video chatting with friends, posting and replying twitter feed on social network, etc.

Further, in certain embodiments, the user may select and assign contents through a sensor-embedded projector. The sensor-embedded projector may project a playlist on a projected surface, such as on a table in front of the user. The user may browse the playlist and select desired contents to be displayed by motion control or voice control. The sensor-embedded projector may detect gestures or voices to obtain instructions from the user. Common interactive motion control features may include swiping to navigate, pinching to zoom, taping to select, etc. Customized motion control gestures may also be included, for example, hands waving in different directions may correspond to different instructions. In addition, the user may set up voice control instructions. When voice control is activated, the sensor-embedded projector may detect voice command from the user and follow corresponding instructions.

According to the availability of displays, the user may assign contents to the displays through the system controller (S508). The system controller may inform the user about the identified displays and the user may select to apply different contents to be shown on different displays. A system interface, such as the system interface 412 in FIG. 4, may be applied to facilitate the process. The system controller may also adopt a pre-configured setting to assign contents to the displays.

Figure 6:
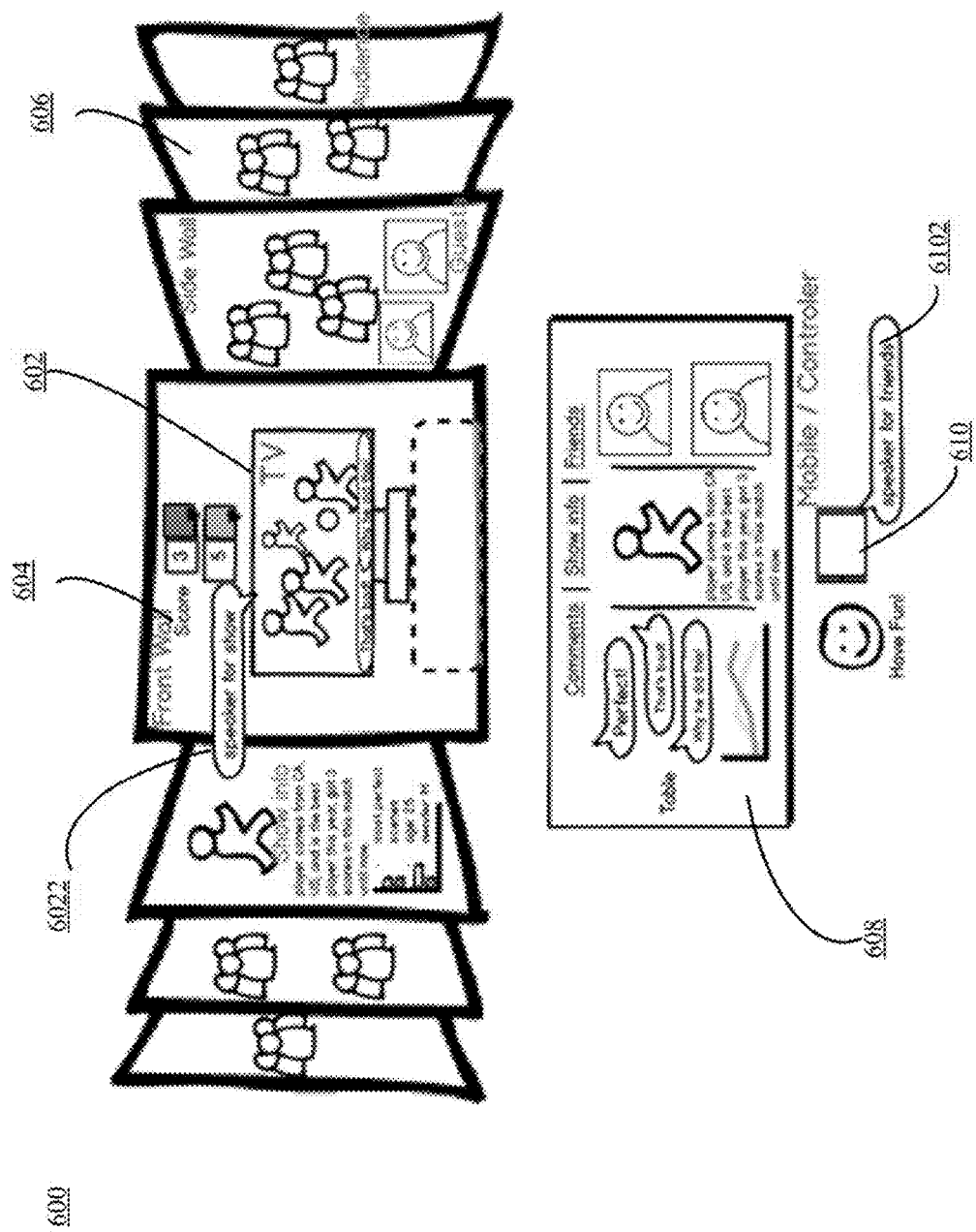
FIG. 6 illustrates an exemplary interface design of a collaborative and scalable information presentation system consistent with the disclosed embodiments.

FIG. 6 illustrates an exemplary interface design of a collaborative and scalable information presentation system consistent with the disclosed embodiments. As shown in FIG. 6, the interface 600 of a collaborative and scalable information presentation system may include a TV 602, a front wall 604, one or more side walls 606, an interaction area 608 and a controller 610. The interface 600 may be an embodiment of the system interface 412 in FIG. 4. Certain components may be omitted and other components may be included.

In certain embodiments, the interface 600 may provide an ultra-wide field of viewing experience. For example, the TV 602 may be sitting in front of a user, playing a primary video content, for example, the main video stream of a sports event. The TV 602 includes a speaker 6022 for playing sounds from the show. A multi-directional projector hanging on the ceiling can project over a large area surrounding the TV 602, including the front wall 604 and the side walls 606. For example, the front wall may be assigned to display real-time scores, real-time statistics of the game. The side walls may be assigned to display audience responses, biography of a player, other guests who are also watching the show, etc.

Further, a smart projector may cover the interaction area 608, such as an end table in front of the couch, enabling the user to interact with the projected content. The projected content may include comments and social feeds from the internet, social interactions with friends, and other related information of the show. In certain embodiments, the interaction area 608 may include three columns: comment column, information column and friend column. The comment column may display the social feeds from the internet and allow the user to post comments to the social network. The information column may allow the user to browse player information, related news and articles of the video content. The friend column may display icons of friends and allow the user to initiate messaging or video chatting with friends. The sensor-embedded smart projector may detect gestures and/or voices of the user to perform interactions including view and post comments to the social network, browse play information, related news and articles, and messaging and video chatting with friends. In other embodiments, the interaction area 608 may be implemented on a smart device, such as a tablet, a smart phone, etc.

The projected contents on the front wall 604, side wall 606 and the interaction area 608 can be automatically adjusted according to the program content of the TV 602.

The interface 600 includes a controller 610 to customize the user's viewing experience. The controller 610 may be one or more smart devices including a remote control, a mobile phone, a tablet, a laptop, etc. The controller 610 may be also coincide with the system controller in certain circumstances, such as when the smart device is running a control application or control App. The user may use the controller 610 to design a customized interface. That is, the user may select which display modalities to use, and assign different contents to be shown on the selected displays according to the user's requirements. Further, when a multi-directional projector is available, the user may decide projected directions, projected surface area and how many projections are working simultaneously. When an embedded-sensor projector is available, the user may configure the motion sensor for interaction with projected contents. Therefore, the video content, related information and social interactions may be presented on surfaces including the TV 602, the walls 604 and 606, the interaction area 608 on the table, and/or any other furniture in the living room. A user may configure the settings for what information to display and where in the room to display.

Returning to FIG. 5, the content display settings may be dynamically updated and configured (S510). In the viewing process, the user may turn on or turn off one of the displays. The user may want to change content assignment to different displays. When there is a projector, the user may also want to change the projected surface. Therefore, the system controller may dynamically update a current status of available displays. When the status of available displays is changed, the user may be prompted to assign contents to currently available displays. Further, the user may configure customized display settings which cause the system controller to assign contents to currently available displays. For example, when one display is turned off, the original contents on that display may be transferred to another display, or may be removed from the displaying contents list. Moreover, the user may be given the option to re-assign contents to available displays and to change projected surface when there is a working projector. In one embodiment, the system controller may switch the entire room settings when the user switches between games. In another embodiment, the system controller can provide pre-configured settings to emulate different viewing environments, e.g., the bar, the theatre, or the arena.

Figure 7:
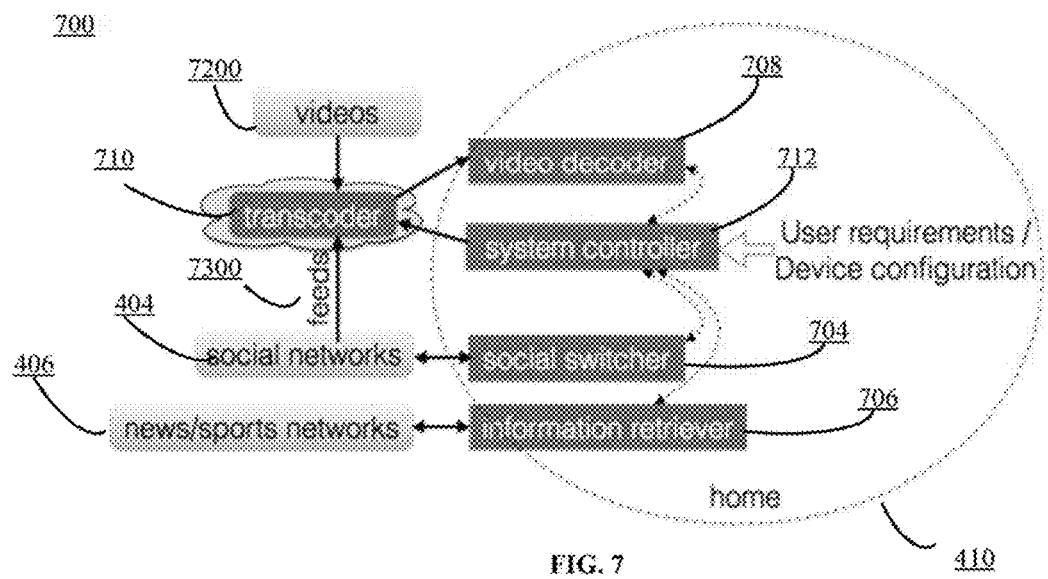
FIG. 7 illustrates exemplary components of a collaborative and scalable information presentation system consistent with the disclosed embodiments.

The video content and related information may be retrieved and processed for displaying according to users requirements (S512). Various components of the collaborative and scalable information presentation system may be employed to do this step. FIG. 7 illustrates exemplary components of a collaborative and scalable information presentation system consistent with the disclosed embodiments.

As illustrated in FIG. 7, the collaborative and scalable information presentation system 700 may include a system controller 712, a social switcher 704, an information retriever 706, a video decoder 708 and a transcoder 710. The system 700 may be an embodiment of the collaborative and scalable information presentation system 400 illustrated in FIG. 4. Certain components may be omitted and other components may be included.

To support scalability, the system controller 712 may be a control center app in the home entertainment system 410 that allows users to configure how and where each component to be displayed in the room. In certain embodiments, the system controller 712 may coincide with the controller 610. The system controller 712 may take user requirements (where and how to display content) and device configuration (number and type of device available) as input. According to the user requirements, the system controller 712 instructs the social switcher 704 and information retriever 708 to communicate with news/sports networks 406. The transcoder 710 may encode videos 7200 obtained from the service/content provider 402 for different quality levels and streaming requirements. The encoded videos may be decoded by the video decoder 708 for further processing according to the instructions from the system controller 712.

To find out what the viewers' real need and collect their requirements, a user study was conducted. Participants expressed a strong desire to get more show related information during the watching process, such as the reaction of their friends on the social network, the statistical data about a favorite player's past performance, and the gossips or news about the teams that are playing. The system 700 may provide and filter information according to the users' need during the watching process, so they do not need to interrupt the viewing experience, type on the mobile devices or browse webpages to find out the information or be busy switching between different social network platforms.

On the content provider side, the service/content provider 402 may employ a cloud infrastructure to prepare the videos 7200 (e.g., server 106). In contrast to conventional systems, the transcoder 710 may not only transcode videos according to the network capability and end-user device specifications, but also compile social feeds 7300 into the videos 7200.

Figure 8:
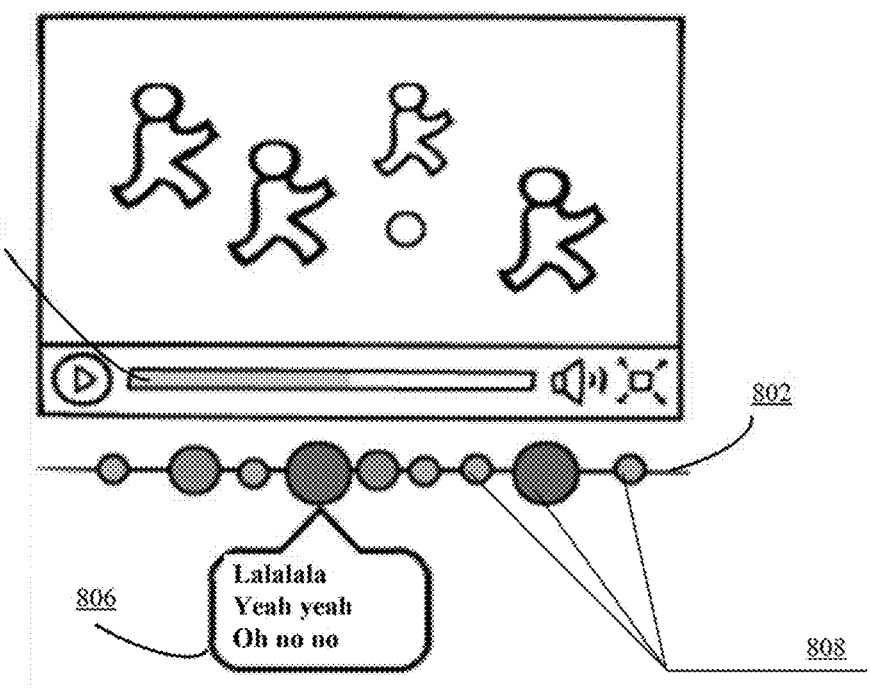
FIG. 8 illustrates an exemplary interface for real-time statistical summary of social feeds consistent with the disclosed embodiments

FIG. 8 illustrates an exemplary interface for real-time statistical summary of social feeds consistent with the disclosed embodiments. In certain embodiments, as illustrated in FIG. 8, a timeline 802 of social feeds 806 may be displayed along the playback bar 804 to provide a real-time statistical summary of social feeds. The social feeds 806 at a certain time stamp may be represented by a corresponding dot 808 on the timeline 802. The size of the dots 808 may indicate the quantity of a filter criteria (such as the number of feeds) defined by user for specific parts of the video. By clicking on any of these dots 808, the detailed feeds can be displayed. Moreover, the social feeds 806 from social network may guide the transcoder 710 to compile highlights of the video 7300 or customized playback of the video 7300. In other words, determining the highlights or summary of a video 7300 may become a social collaborative effort. In certain embodiments, the color of the dot 808 may also be used to indicate the quality (e.g., the relevance) and/or the quantity of the feeds, a darker color may indicate higher quality and/or larger quantity.

Returning to FIG. 7, the system controller 712 may consult the video decoder 708 for decoding capability and probe the networks 404 and 406 to estimate bandwidth and delay. The system controller 710 then sends requests to the service/content provider 402 accordingly.

Further, the system controller 712 may communicate with the transcoder 710 for automatically preparing contents to match the compatibility on the displays according to content assignments and users' specifications. In certain embodiments, when there is a projector, a projection mapping technology may be employed to interact with the projector to fit desired images/videos onto the surface of any object. The projected contents may be distorted through the sensing of the texture and color of surfaces of surrounding objects such that a normal visual effect of the projected contents can be achieved. Users do not need to worry about there may not be enough flat curtain or empty walls for the projection, since the projected light may be modulated to achieve a desired color and the texture can be corrected, given knowledge of the existing surface color and geometry.

In operation, the videos 7200 may be obtained from the service/content provider 402. The system controller 712 may communicate with the social networks 404 through the social switcher 704 such that the user can send and receive social feeds. The system controller 712 may also retrieve the related information of the video content by communicating with information sources 408 through the information retriever 706. The information sources 408 may include social networks 404 and sports/news networks 406 that deliver information about the event according to the social demand. The transcoder 710 may receive the videos 7200, the social feeds 7300 obtained from the social networks 404, video related information from the information sources 408, network capability and end-user device specifications from the system controller 712. The transcoder 710 may not only transcode videos for different quality levels and streaming requirements, but also can compile social feeds into the videos. The video decoder 708 may decode the video content from the transcoder 710 for presenting on the different displays.

Returning to FIG. 5, the prepared video content and the related information may be presented on a plurality of displays according to user requirements as controlled by the system controller. The video content may be played at a primary location in front of the user (S514). The related information of the video content may be presented on one or more second displays (S516). Further, an interactive display may be employed to interactively presenting related information to the user. The displays for presenting the contents are scalable. That is, the system can be scaled from a single to any number of devices presented around a user. The content presenting can be tailored according to a user's specific taste and resource availability.

In one embodiment, the displays may include a TV, a multi-directional projector, a sensor-embedded projector and a smart device. The TV may display the video content at a primary location in front of the user. In the mean time, the related information of the video content may be played on one or more second displays. For example, the multi-directional projector may project contents to surrounding walls. The user may assign high priority information to be projected on the surrounding wall around the TV. The secondary information may be projected on the side wall. Further, the related information of the video content can also be interactively presented to the user on an interactive display. For example, the sensor-embedded projector may arrange all content which may need user's interaction on a coffee table, such as the video chatting with friends, posting and replying twitter feed on social network, and browsing related news and articles. In another embodiment, the first display, the second display and the interactive display may be realized simultaneously on a single smart device (TV, tablet, or smartphone).

Further, interactively presenting related information of the video content may provide users an engaging social interaction experience. People always want to share their feelings with others when they watch an exciting game, the disclosed embodiments allow users not only be a passive viewer, but also can express, communicate and get participated to the exciting events.

People have different friend structures may have different communication needs to different friend groups. The social switcher 704 may organize a user's communication targets in three levels: generic, contacts and invited guests. The generic level may connect with strangers who are watching the same channel. The user may not have specific communication with them, but can get the statistical data, such as the voting or supporting percentage, and read the hottest comments they have left. The user can add the stranger to his/her contacts list. The contacts level may connect to people who have built a "friendship" with the user. The user can read and reply the comments they left for the game. The invited guests may include contacts who have been invited by the user to watch the game together. The user may video chat or send voice messages to the invited guests. As the highest priority communication target, the invited guests can accompany with the user to watch the game and share opinions and feelings just like the real guests who are sitting in the user's living room.

As speech is the most natural way of communication in most cases, the speaker 6022 may offer voice communication as a primal way of interaction for a user with the user's friends. In certain embodiments, the voice communication can be made only possible with invited guests that are watching the same program. Providing a private room associated to certain contents is very important to offer a compelling content related experience. People can also express themselves by texting and pushing the emoticons to their buddies' screen. For example, a supporter of David Beckham may send cheerful voice message to his friends who are also watching the same game, and discuss how great it is without heading down for texting and missing any moment on the field, like what he would do in the stadium.

Thus, the disclosed invention can bring personal content, rich communication and community support together by offering the possibility of having a real time communication over the live TV broadcast content with users' friends. CITIS provides an enhanced user experience model, with the right mix of entertainment and social needs, by combining public broadcast, the surroundings and the need to communicate into the system framework design. The disclosed embodiments provide an evolution to enrich the stage of the experience with immersive environment and ambient intelligence technologies to improve participation in events and transform the consumers from viewer to commentator and actor.

The design and implementation of CITIS can provide innovative solutions for real-time video transcoding for multi-view videos, compiling video content according to social feeds and user preference, integrating various services in real time. These solutions not only provide a collaborative system, but also provide a multi-view and social-driven multimedia streaming system.

It is understood that the disclosed collaborative and scalable information presentation system is not limited to sports watching scenario. The disclosed systems and methods can also be applied to other information presentation scenarios, such as watching news, movies and video games, displaying exhibits, presenting technologies and business plans, etc. Further, the disclosed system and method can be applied to any devices with displays, such as smart phones, tablets, PCs, smart watches, and so on.

Other embodiments of the disclosure will be apparent to those skilled in the art from consideration of the specification and practice of the invention disclosed herein. It is intended that the specification and examples be considered as exemplary only, with a true scope and spirit of the invention being indicated by the claims.

What is claimed is:

1. An information presentation system, comprising:
   a video module configured to obtain video content to be presented to a user;
   a network module configured to obtain certain information related to the video content for the user including at least a first type of related information, a second type of related information, and a third type of related information, wherein the network module comprises:
     a social switcher configured to communicate with social networks and interact with the system controller such that the user can send and receive social feeds; and
     an information retriever configured to communicate with information sources, to retrieve the information related to the video content, and to provide the information related to the video content to the system controller, the information sources including one or more of a service provider, a social network, a news network and a sports network;
   a system controller configured to perform content assignments to available displays according to user requirements for the video content and the information related to the video content, wherein the available displays include:
     a first display configured to display the video content at a primary location in front of the user;
     one or more second displays configured to display the first type of related information at the primary location surrounding the first display and to display the second type of related information on a secondary location along the side of the primary location, a resolution of the first type of related information displayed surrounding the first display being lower than a resolution of the video content displayed on the first display; and
     an interactive display configured to interact with the user and display the third type of related information;
   a transcoder configured to encode the video content for different quality levels and streaming requirements of the available displays, and to compile the social feeds into the video content; and
   a video decoder configured to inform the system controller about a decoding capability of the video decoder and to decode the video from the transcoder.

2. The information presentation system according to claim 1, wherein:
   the second display is a multi-directional projector configured to project the first type of related information and the second type of related information on a plurality of surfaces; and
   the interactive display is a sensor-embedded projector configured to follow instructions of the user through at least one of motion control and voice control, and to provide a user interface for interactively presenting the third type of related information including browsing news and articles related to the video content, messaging and video chatting with friends of the user, and viewing, posting and replying social feeds on a social network.

3. An information presentation system, comprising:
a video module configured to obtain video content to be presented to a user;
a network module configured to obtain certain information related to the video content for the user including at least a first type of related information, a second type of related information, and a third type of related information; and
a system controller configured to perform content assignments to available displays according to user requirements for the video content and the information related to the video content, wherein the available displays include:
a first display configured to display the video content at a primary location in front of the user;
one or more second displays configured to display the first type of related information at the primary location outside the first display and to display the second type of related information on a secondary location along the side of the primary location; and
an interactive display configured to interact with the user and display the third type of related information, wherein:
the video content is a real-time match between a plurality of players in a match field;
the first type of related information includes at least one of scores of the match, arrangements of the players, real-time statistical data of the match and a background view of the match field;
the second type of related information includes at least one of responses of audience in the match field, posters of the players, and biography of the players;
the third type of related information includes at least one of match-related social feeds on a social network, match-related news and articles; and
the interactive display is configured to provide features including video chatting with friends of the user, posting and replying social feeds on the social network, and browsing the match-related news and articles.

4. The information presentation system according to claim 1, wherein:
a timeline containing a plurality of dots is displayed along with a playback bar of the video content, providing a real-time statistical summary of the social feeds;
each dot at a time stamp on the timeline corresponds to the social feeds at the time stamp; and
when the user clicks on a dot, the detailed social feeds at the corresponding time stamp are displayed.

5. The information presentation system according to claim 4, wherein:
a size of the dots corresponds to one of a quantity and a quality of the social feeds based on a filter criteria defined by the user.

6. The information presentation system according to claim 4, wherein:
a color of the dots corresponds one of a quantity and a quality of the social feeds based on a filter criteria defined by the user.

7. The information presentation system according to claim 1, wherein the social switcher organizes communication targets of the user at three levels, including:
a generic level configured to connect with strangers watching the same video content, to get statistical data including voting and supporting percentage, to read a hottest comment, and to enable adding a stranger to a contacts list;
a contacts level configured to connect with people on the contacts list, and to read and reply comments left by the people on the contacts list; and
an invited-guests level configured to connect with an invited guest for watching the video content together with the user, and to enable video chatting and sending voice messages to the invited guest.

8. The information presentation system according to claim 2, wherein the sensor-embedded projector and the system controller is integrated in one smart device; and
the user interface for interactively presenting the third type of related information further including a comment column, an information column and a friend column, wherein:
the comment column is configured to display the social feeds on the social network and allow the user to view, post and reply social feeds on the social network;
the information column is configured to display the news and the articles related to the video content; and
the friend column is configured to display icons of the friends of the user and facilitate the user to message and video chat with the friends of the user.

9. The information presentation system according to claim 1, wherein:
the system controller is an application on a smart device that takes user requirements and device configuration as input;
the device configuration includes a number of the available displays and types of the available displays;
the user requirements include how and where to display the video content, the first type of related information, the second type of related information and the third type of related information; and
when the device configuration changes, the system controller dynamically updates the content assignments according to one of a preset device configuration and requirements from the user.

10. An information presentation method, comprising:
starting a system controller to access an information presentation system;
detecting one or more available displays in the information presentation system;
selecting to play a video content and to present certain information related to the video content by a user, the related information including at least a first type of related information, a second type of related information, and a third type of related information;
performing content assignments to available displays according to requirements from the user;
obtaining the video content and the information related to the video content, comprising:
communicating with social networks and interacting with the user such that the user can send and receive social feeds;
communicating with information sources to retrieve the information related to the video content, information sources including one or more of a service provider, a social network, a news network and a sports network;
compiling, by a transcoder, the social feeds into the video content and encoding, by the transcoder, the video content for different quality levels and streaming requirements of the available displays; and
decoding the video content from the transcoder;

displaying the video content on a first display at a primary location in front of the user;

displaying, on one or more second displays, the first type of related information at the primary location surrounding the first display and displaying the second type of related information on a secondary location along the side of the primary location, wherein a resolution of the first type of related information displayed surrounding the first display is lower than a resolution of the video content displayed on the first display; and interactively presenting the third type of related information on an interactive display.

11. The information presentation method according to claim 10, further comprising:

displaying a timeline containing a plurality of dots along with a playback bar of the video, providing a real-time statistical summary of the social feeds;

corresponding each dot at a time stamp on the timeline to the social feeds at the time stamp; and when the user clicks on a dot, displaying the detailed social feeds at the corresponding time stamp.

12. The information presentation method according to claim 11, wherein:

a size of the dots corresponds to one of a quantity and a quality of the social feeds based on a filter criteria defined by the user; and a color of the dots corresponds to one of a quantity and a quality of the social feeds based on a filter criteria defined by the user.

13. The information presentation method according to claim 10, further comprising organizing communication targets of the user at three levels, including:

a generic level configured to connect with strangers watching the same video content, to get statistical data including voting and supporting percentage, to read a hottest comment, and to enable adding a stranger to a contacts list;

a contacts level configured to connect with people on the contacts list, and to read and reply comments left by the people on the contacts list; and an invited-guests level configured to connect with an invited guest for watching the video content together with the user, and to enable video chatting and sending voice messages to the invited guest.

14. The information presentation method according to claim 10, wherein interactively presenting the third type of related information further including:

following instructions of the user through at least one of motion control and voice control, and providing a user interface for interactively presenting the third type of related information including browsing news and articles related to the video content, messaging and video chatting with friends of the user, and viewing, posting and replying social feeds on a social network.

15. The information presentation method according to claim 14, wherein:

the second display is a multi-directional projector configured to project the first type of related information and the second type of related information on a plurality of surfaces;

the interactive display is a sensor-embedded projector; and the user interface for interactively presenting the third type of related information further including a comment column, an information column and a friend column, wherein:

the comment column is configured to display the social feeds on the social network and allow the user to view, post and reply social feeds on the social network;

the information column is configured to display the news and the articles related to the video content; and the friend column is configured to display icons of the friends of the user and facilitate the user to message and video chat with the friends of the user.

16. The information presentation method according to claim 10, wherein:

the video content is a real-time match between a plurality of players in a match field;

the first type of related information includes at least one of scores of the match, arrangements of the players, real-time statistical data of the match and a background view of the match field;

the second type of related information includes at least one of responses of audience in the match field, posters of the players, and biography of the players;

the third type of related information includes at least one of match-related social feeds on a social network, match-related news and articles; and the interactive display is configured to provide features including video chatting with friends of the user, posting and replying social feeds on the social network, and browsing the match-related news and articles.

17. The information presentation method according to claim 10, wherein:

the system controller is an application on a smart device that takes user requirements and device configuration as input;

the device configuration includes a number of the available displays and types of the available displays;

the user requirements include how and where to display the video content, the first type of related information, the second type of related information and the third type of related information; and when the device configuration changes, the system controller dynamically updates the content assignments according to one of a preset device configuration and requirements from the user.

* * * * *